Feb. 10, 1970     J. D. ESDAILE     3,494,764
PROCESS FOR RECOVERY OF COPPER
Filed Jan. 23, 1967

FLOWSHEET OF COPPER PROCESS

United States Patent Office 3,494,764
Patented Feb. 10, 1970

3,494,764
PROCESS FOR RECOVERY OF COPPER
James Durie Esdaile, Glen Waverley, Victoria, Australia, assignor to Commonwealth Scientific and Industrial Research Organization, Melbourne, Victoria, Australia
Filed Jan. 23, 1967, Ser. No. 611,029
Claims priority, application Australia, Jan. 25, 1966, 774/66
Int. Cl. C22b *15/12;* C01g *3/00*
U.S. Cl. 75—10.8                                                12 Claims

ABSTRACT OF THE DISCLOSURE

A process for the recovery of copper from a copper sulphate solution by a selective precipitation of copper as Chevreul's salt comprising mixing in a first precipitation stage the copper sulphate solution and a solution of a magnesium bisulphite, thereby precipitating a substantial proportion of the copper as Chevreul's salt; separating the Chevreul's salt to recover the copper, mixing the resulting liquor with a solution of calcium bisulphite to precipitate calcium sulphate and to leave a solution which comprises the magnesium as the bisulphite, and circulating the bisulphite solution to a further cycle of the first precipitation stage.

---

Figure 1:
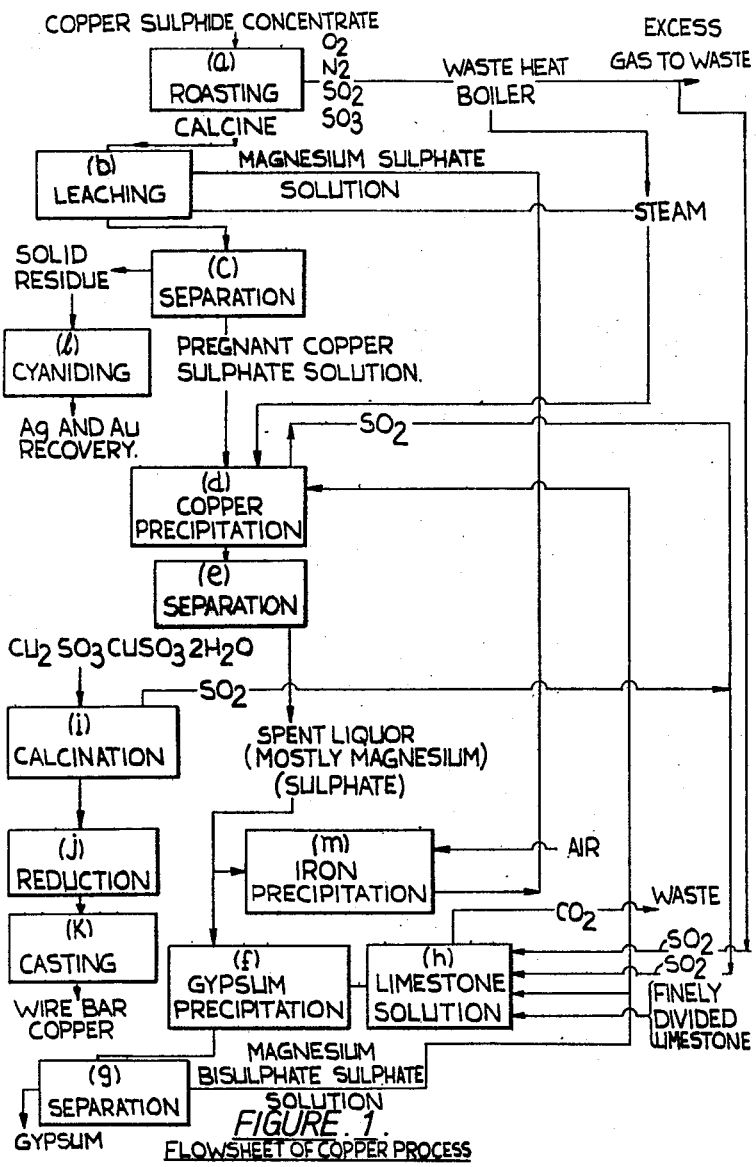

This invention relates to the recovery of copper from copper-containing solutions and, more specifically, to the recovery of copper from aqueous sulphate solutions, such as those obtained by the leaching of oxidised, roasted or partly roasted copper ores or ore concentrates, or mine liquors.

Conventional electrowinning processes for the recovery of copper from solution can be operated only where adequate sources of electric power are available and, because large quantities of sulphuric acid are produced in such processes, an electrowinning plant must either be situated near to other industries which can utilise the excess acid or provision must be made for the disposal of the acid, or for partial neutralisation of it for recycling. Limestone is usually used for this latter purpose, or may be used in an intermediate step in the disposal of acid waste solutions, so that the electrowinning plant must therefore be within easy access of suitable limestone deposits.

Various alternative proposals have been put forward for hydrometallurgical processes for the recovery of copper from copper-containing solutions, generally utilising sulphites or bisulphites as precipitants. For example, in U.S. Patent Nos. 1,286,531; 1,278,854 and 1,286,532 (Christensen) a process is described whereby particulate copper ore is leached by agitation with a solution of sulphur dioxide in water, and from the resulting solution 75% of the copper may be precipitated as a cupro-cupric sulphite by heating the solution to drive off excess sulphur dioxide. The copper remaining in solution which is present as the sulphate is precipitated as copper sulphate by reaction with calcium bisulphite formed by the addition of lime or limestone to the solution. In U.S. Patent No. 2,357,715 (Westby), there is described a process in which a solution containing copper sulphate is produced by treating an ore containing oxidised copper sulphides with a solution of sodium bisulphite to produce an insoluble product containing cupro-cupric sulphites, which is then oxidised by aeration-oxidation-heating. The resultant copper sulphate is leached from the oxidised material and the solution thus obtained is treated with calcium bisulphite to produce a solution of cupric bisulphite, from which an insoluble cupric sulphite is produced by the addition of an alkali metal sulphite.

In both the Christensen and Westby processes there are several disadvantages, the principal one being the severe contamination of the copper sulphite end product by co-precipitation of calcium sulphate with the cupric sulphite. Removal of the calcium sulphate to yield pure copper sulphite is extremely difficult and this factor is believed to be the main reason for the failure of these processes to gain commercial acceptance.

It is therefore an object of the present invention to provide an improved process for the recovery of copper which overcomes the above disadvantage of co-precipitation of calcium sulphate. It is also desired to provide a process for the recovery of copper by selective precipitation from copper containing solutions whereby an end product, which is substantially free from other metals present in solution, is obtained.

Broadly stated, the present invention involves the precipitation of copper as Chevreul's salt (cupro-cupric sulphite: $Cu_2SO_3 \cdot CuSO_3 \cdot 2H_2O$) from an aqueous copper sulphate solution by mixing in a first precipitation stage the copper sulphate solution and a solution of a magnesium bisulphate, which may be wholly or partly saturated with sulphur dioxide, in such proportions as to achieve a final pH value (measured at ambient temperature) in the range 1 to 3 after reaction in the mixed solution, by bringing the solution to a temperature of at least 40° C. and thereby precipitating a substantial proportion of the copper as Chevreul's salt and leaving a liquor which comprises a solution of the magnesium sulphate; separating the Chevreul's salt to recover the copper; mixing the liquor with a solution of calcium bisulphite to precipitate calcium sulphate and to leave a solution which comprises the magnesium as the bisulphite; and circulating the bisulphite solution to a further cycle of the first precipitation stage.

Magnesium is especially preferred for use in the present process, as it commonly occurs naturally in association with mineral deposits of calcium carbonate, an important raw material in the present process, in a form suitable for providing "make-up" magnesium. The particular suitability of magnesium is surprising moreover, in view of the disclosure of U.S. Patent 2,357,715 in which it is inferred that conditions suitable for precipitation of Chevreul's salt would also cause precipitation of magnesium and several other cations. Moreover, it has been found that magnesium bisulphite may be used without the formation of undesirable complexes with the cupro-cupric sulphite, or any appreciable formation of insoluble sulphite under the conditions specified for precipitation.

The rate of precipitation increases with increasing temperature, and with the concentration of copper in solution, becoming appreciable at about 40° C. and rapid at temperatures of 80° C. or above. Precipitation can be carried out satisfactorily to temperatures up to 100° C., though it is not thought to be economical at temperatures above this level. The preferred temperature range for precipitation is 65° C. to 80° C. since temperatures within this range generally provide a satisfactory balance between the rate of precipitation and heating costs.

The rate of precipitation is, of course, also improved by stirring.

The chemical reaction involved in this stage of the process has been found to be:

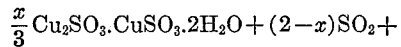

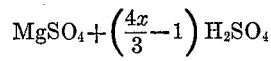

where $x$ is the ratio of copper sulphate reacted with bisulphite and has been found to vary from slightly above 0.75 for a very high ratio of magnesium bisulphite to copper sulphate, a condition associated with the production of very little free sulphuric acid, to 1.3 for a very low ratio of magnesium bisulphite to copper sulphate, a condition associated with a correspondingly high production of the free acid.

Free sulphur dioxide initially present in the magnesium bisulphite solution may react as follows:

$$6H_2O + 3SO_2 + 3CuSO_4 = Cu_2SO_3 \cdot CuSO_3 \cdot 2H_2O + 4H_2SO_4$$

However, it is had been found that this reaction provides only a limited contribution to the production of Chevreul's salt and free sulphuric acid.

The pH of the solution changes during precipitation but generally lies between one and three units measured at room temperature. The preferred pH after precipitation is usually between 1 and 3 units measured at room temperature. Control of the pH is effected by controlling the molar ratio of magnesium bisulphite to copper sulphate.

The generation of free sulphuric acid in the Chevreul's salt precipitation stage has several advantages, the principal ones being that: (i) the control of the free acid production, and hence the pH of the reaction solution, by means of the ratio of bisulphite to copper sulphate permits highly selective precipitation of the Chevreul's salt in the presence of other cations, as will be described below; and (ii) portion of the liquor from the Chevreul's salt precipitation stage may be used to secure efficient leaching of copper from reacted copper ore concentrates to form further copper sulphate solution and so reduces the additional quantity of sulphuric acid required.

It has been found to be of great economic importance to minimize the introduction of calcium ions into the Chevreul's salt precipitation stage, and so avoid the heavy contamination of the product with calcium sulphate experienced by prior art processes. For this purpose, the bisulphite solution used for precipitation is regenerated and recycled by mixing the supernatant liquor from the precipitation stage, which contains the sulphate of the magnesium with a solution of calcium bisulphite produced by suspending limestone, calcium carbonate, calcium oxide or other suitable calcium compound in water and/or in a portion of the mother liquor and passing in sulphur dioxide bearing gases. The limestone is optionally ground and/or calcined. Where magnesium bisulphite is used as the precipitant, the limestone preferably contains some magnesium carbonate or oxide, to provide "make-up" magnesium for the process to compensate for any small losses which occur. If the limestone does not contain magnesium, dolomite, dolomitic limestone or any other suitable source of magnesium may be added from time to time.

The present process therefore requires the use of a magnesium bisulphite precipitant which has been substantially freed from calcium ions. It does not however depend upon the reduction of the concentration of sulphate ions in solution by the formation of insoluble calcium sulphate, but rather a high sulphate ion concentration is required, as distinct from prior art processes, for the purpose of depressing the concentration of calcium ions below the limited solubility level of calcium sulphate.

Thus, in a preferred embodiment of the present invention, a magnesium bisulphite solution is used for the copper precipitation and contains substantial amounts of free bisulphate and sulphate ions and the bisulphite solution is regenerated by mixing the supernatent liquor which contains additional magnesium sulphate from the copper precipitating stage with a solution of calcium bisulphite that contains large amounts of magnesium sulphate and bisulphite. This calcium bisulphite solution is produced by suspending limestone in part of the solution leaving the gypsum precipitating stage and passing in sulphur dioxide bearing gases into the suspension. The other part of the liquor leaving the gypsum precipitation stage is the bisulphite solution used for the precipitation of the copper. The principal object of the foregoing is to secure a calcium-free solution for use in precipitating copper.

It is desirable, for effective copper precipitation, that the bisulphite solution contains at least some free sulphur dioxide in solution and it is particularly preferred to use solutions saturated with sulphur dioxide.

This free dissolved sulphur dioxide is added during the limestone solution stage. However, gypsum is considerably more soluble in aqueous solutions of sulphur dioxide than in water and so could easily be carried into the copper precipitation stage and result in contamination of the Chevreul's salt when free sulphur dioxide is present. To avoid this danger, it is desirable, according to the invention, to maintain a high concentration of free sulphate and bisulphate ions in the solutions recycling through the ore leaching, copper precipitating, limestone solution, and gypsum precipitating stages. This high concentration of sulphate and bisulphate ions results in a high proportion of magnesium sulphate to calcium bisulphite entering the gypsum precipitating stage, and ensures substantial removal of the calcium ions from the bisulphite solution.

It has been found that maintaining a ratio of one mole of magnesium sulphate for each mole of magnesium bisulphite, in the solution leaving the gypsum precipitating stage was generally effective in providing the substantial removal of calcium ions in that stage. However, where Chevreul's salt is required in high purity and free from co-precipitated calcium sulphate, a ratio of up to two moles of sulphate to one mole of bisulphite may be required. The exact ratio for the most economic operation would have to be determined by practical operation of the process, as this will vary both with the particular composition of the raw materials used, the degree of purity required for the cupro-cupric sulphite, and also the level of copper recovery desired in each cycle.

It has also been found that the presence of such equimolar quantities of magnesium sulphate in the corresponding bisulphite precipitant solution does not cause more than a small decrease in the recovery of copper, provided that the ratio of bisulphite to copper sulphate is such that free sulphuric acid is produced during the course of the precipitation and the pH is maintained as specified.

The reaction occurring in the gypsum precipitation stage is:

$$MgCO_4 \text{ (in excess)} + Ca(HSO_3)_2 + 2H_2O = CaSO_4 \cdot 2H_2O + Mg(HSO_3)_2 + MgSO_4 \text{ (excess)}$$

The ratio of the bisulphite to sulphate in the liquors leaving the gypsum precipitating stage can be controlled in the following ways:

(i) A reduction of the bisulphite to sulphate-plus-bisulphate ratio is achieved by adding less limestone to the limestone solution than the equivalent new sulphate-plus-bisulphate ions introduced into the process from the leaching, copper precipitating and iron removal or sulphite oxidation stages.

(ii) An increase in the ratio is achieved by adding more limestone to the limestone solution stage than the equivalent new sulphate-plus-bisulphate ions introduced, as indicated above.

(iii) Once a satisfactory ratio has been achieved, this may be maintained at a constant level by adding the amount of limestone to the limestone solution stage which is equivalent to the new sulphate-plus-bisulphate ions entering as indicated above.

The amount of gypsum precipitated may be increased by increasing the ratio of the volumes of the solutions entering the gypsum precipitating stage from the copper precipitating stage and the limestone solution stage, respectively.

In the limestone solution stage, the calcium carbonate introduced as limestone reacts with the sulphur dioxide to form calcium bisulphite with the liberation of carbon dioxide, as follows:

$$CaCO_3 + H_2O + 2SO_2 = Ca(HSO_3)_2 + CO_2$$

Similarly, any magnesium carbonate associated with the limestone will also react with the sulphur dioxide to generate fresh magnesium bisulphite and to liberate further carbon dioxide, as follows:

$$MgCO_3 + H_2O + 2SO_2 = Mg(HSO_3)_2 + CO_2$$

The calcium bisulphite product formed in the limestone solution stage will generally be clear for relatively low limestone additions since, in this case, the bisulphite formed by the above reaction will be less than the solubility limit of calcium bisulphite. This solution may be wholly or partly saturated with sulphur dioxide.

It has been found, however, that the addition of limestone in excess of that necessary to produce a saturated calcium bisulphite solution may be used with advantage. In this case a suspension or slurry comprising a saturated solution of calcium bisulphite, which is wholly or partly saturated with sulphur dioxide and containing solid calcium and/or magnesium sulphite and possibly calcium sulphate, is obtained. Such a suspension or slurry has a very high effective concentration of bisulphate since, as calcium bisulphite is consumed in the gypsum precipitation stage, further calcium bisulphite is generated from the calcium sulphite and dissolved sulphur dioxide, as follows:

$$CaSO_3 + H_2O + SO_2 = Ca(HSO_3)_2$$

and additional magnesium bisulphite may also be generated directly, for example $$MgSO_3 + H_2O + SO_2 = Mg(HSO_3)_2$$

In the present invention a slurry or suspension is generally preferred, since this will produce a magnesium bisulphite solution in the gypsum precipitation stage, having a considerably higher bisulphite concentration than obtainable with a calcium bisulphite solution, thus providing a significant improvement over the prior art. The generation of solutions having high bisulphite contents is of commercial importance in reducing the quantity of solutions which must be heated for the precipitation of a given weight of copper from a copper sulphate solution of given constant composition.

In order to further increase the concentration of bisulphite in the calcium bisulphite solution, it is preferable to carry out the limestone solution in two stages. In the first stage, finely divided limestone in aqueous suspension is contacted with sulphur dioxide bearing gases, such as those obtained from the roasting of metal sulphides in air, to thereby form a suspension containing substantially carbonate free materials and comprising essentially calcium sulphite. In the second stage the suspension obtained from the first stage is treated with substantially pure sulphur dioxide which is evolved from the Chevreul's salt precipitation stage and, possibly, from the calcination of the Chevreul's salt in the absence of air. In this way essentially all carbon dioxide is liberated in the first stage thus minimising the loss of pure sulphur dioxide which would otherwise occur in the second stage, and thus achieving a higher concentration of bisulphite in solution than would be otherwise obtainable, due to the increased partial pressure of sulphur dioxide possible with the pure gas. Exclusive use of substantially pure sulphur dioxide in a single stage would be possible but would generally necessitate the use of gas from an external source and would not be economical.

From the above, it is apparent that the present process possesses a number of advantages over the prior art processes, including: (i) the elimination of the steps of converting the copper in the ore firstly to an insoluble sulphite and then to the soluble sulphate; (ii) the avoidance of the heavy contamination of the final precipitate with calcium sulphate by using a magnesium bisulphite or bisulphite as the precipitant and preferably by maintaining high concentrations of sulphate ions throughout the process, whereby carry-over of calcium from the regeneration stage is minimised; (iii) the high solubilities of the metal bisulphite—in particular magnesium bisulphite—as compared with calcium bisulphite allow the use of concentrated solutions.

A further advantage of considerable importance provided by the present process is the selective precipitation of high purity Chevreul's salt from copper containing solutions in the presence of certain cations. By using a small ratio of the bisulphite to copper sulphate, and so producing a low pH value, high recoveries of cupro-cupric sulphite are still obtained. This surprising feature of the process is of considerable economic value since it has been found that, as the pH of the mixture is reduced, the ease with which a precipitate free from contamination by cations such as those of zinc, manganese, nickel, cobalt, aluminium, chromium and in particular magnesium, is increased. Thus, as the final free sulphuric acid concentration and hence the pH of the solution may be readily controlled, the present process provides a convenient means for the selective precipitation of cupro-cupric sulphite in the presence of the above cations.

It should be noted however that selenium, tellurium, arsenic, antimony, bismuth and certain other metals cannot be separated in this way. Copper solutions containing significant amounts of these metals will therefore require a prepurification step, involving treatment of the copper solution with limestone and aeration (or some similar known procedure) to remove these metals before the copper is precipitated.

The manner in which Chevreul's salt may be selectively precipitated is illustrated in the following procedure, with reference to a copper sulphate solution containing zinc as zinc sulphate:

(i) Precipitation of approximately 70% of the copper as high purity Chevreul's salt, using magnesium bisulphite in a first stage, to produce a final product at an approximate pH of 1.3 to 1.4 by heating the mixture to a temperature in the range 65 to 80° C.

(ii) Precipitation in a second stage of most of the remaining copper and some zinc by the addition of further magnesium bisulphite to the solution resulting from the first stage at a final pH in the range 1.6 to 3.0 by heating the mixture to a temperature in the range 65 to 80° C.

(iii) Precipitation of copper from the solution resulting from the second stage by the cementation process using, for example, iron or zinc in a third stage.

(iv) Electrowinning of the zinc or iron from the sulphate solution resulting from the third stage to produce the metal for reuse and sulphuric acid in a fourth stage.

(v) Addition of the sulphuric acid from the fourth stage to the residue of the second stage to produce a final metallic copper product, a solution of copper sulphate and iron or zinc sulphate for further treatment, and sulphur dioxide gas to be used in the limestone solution stage.

The reddish precipitate of Chevreul's salt produced by the process may, as formed, contain small amounts of cuprous sulphite, cuprous oxide, cupric oxide, copper or other compounds of copper, oxygen and/or sulphur to a total of less than 1%. The copper precipitate may also be associated with up to about 0.5% of other materials which were present in the solution prior to precipitation, although this level could be caused to increase up to about, say 5%, if this is advantageous to subsequent steps of the process. In particular, if iron is present in the solution, some may be co-precipitated with the copper precipitate in a hydrated or non-hydrated form, although not all of the iron present in the original solution will be removed in this manner. On the other hand, the precipitate is relatively free from noxious impurities which would require the copper to be electrolytically refined after calcination and reduction of the precipitate to metallic copper.

The amount of iron present in the precipitate depends on the temperature at which the precipitation is carried out; in general, less iron is precipitated at lower temperatures. Usually there is an optimum temperature between 40 and 100° C. at which the rate of precipitation is satisfactorily high and the iron content of the product is satisfactorily low. The precise optimum temperature is determined by a number of factors, including ore quality and composition, operating economics and the like. Usually the optimum temperature in this respect will lie between 65° and 80° C. Copper recovery may also be increased by operating at temperatures higher than those mentioned above and/or pressures other than atmospheric.

It is to be understood that it is not intended to limit the invention to a precipitate of the exact composition of Chevreul's salt as the precipitate obtained from any particular solution may vary slightly in overall composition, depending on the nature and quantities of the cations (other than copper) which are present in the solution, the nature of the anions (other than sulphate and bisulphite) which are present, and the composition and concentration of the bisulphite precipitant solution.

The copper precipitate may be removed from its aqueous supernatent liquor by way of any suitable known method, for example, by decantation, centrifugal action involving cyclones or a centrifuge, or by filtration. It then may be calcined to produce a material suitable for working up to copper. Silica may be added to assist in the removal of residual iron and/or lime from the precipitate and the slags produced by the addition of silica may be treated by known means to recover the copper metal. Alternatively, the slags may be treated in a rotary furnace with copper matte or iron sulphide concentrate. The matte so obtained may then be treated in a convertor to recover the copper.

A portion of the mother liquor remaining after the precipitation of Chevreul's salt may be heated in contact with air, or have air bubbled through it, so as to precipitate, as basic iron compounds (which may be hydrated) a large proportion of the iron present in the solution, and thus provide liquor suitable for leaching further ore. The iron-containing precipitate may also contain, in combined form, other elements including copper, zinc, cobalt, cadmium, nickel or manganese. The precipitate may be, therefore, subsequently treated by known methods to extract the more valuable of these elements. Apart from the recovery of the valuable metals, the iron precipitating step may be utilized to purify the solutions recycled in the process of the invention, as indicate above.

The copper-bearing solution from which the precipitation is made may be obtained by leaching roasted copper concentrates or ores. The leaching may be carried out using part or all of the recycled filtrates containing soluble sulphates from the iron and copper precipitating stages and/or water or sulphuric acid. The copper-bearing solutions may also be obtained from water of underground origin ("mine liquors") or by leaching in stalls or heaps, or by leaching the ore in situ, or by bacterial action on copper-bearing material.

When the recycled filtrates are used in the leaching step, it may be advantageous when only a little free sulphuric acid is produced to add sulphuric acid to the solution being recycled. This reduces the bisulphite or sulphite content of the solution and so minimises the amount of iron entering the solution from the calcine and also increases the extent of extraction of the copper from the calcine.

In order that the invention may be more easily and fully understood, a particular and preferred process in accordance with the invention will now be described by way of example with reference to the accompanying drawing which is a flow sheet of the chosen process.

The various stages are lettered for reference in the following stage-by-stage description.

(a) Roasting

The first stage consists of selective sulphating roasting of copper sulphide ore concentrate. In the roasting, the iron present is converted to ferric oxide which is only slightly soluble in sulphuric acid solutions, the copper to soluble copper sulphate, and the sulphur uncombined as sulphate is released as sulphur dioxide and sulphur trioxide in the exit roaster gases. The sulphating roasting of copper sulphide concentrates may conveniently be carried out in a fluidised bed reactor.

(b) and (c) Leaching and Separation

The second stage consists of the extraction of copper sulphate from the calcine by leaching with magnesium sulphate solutions produced elsewhere in the process. The recovery of copper in solution is high for roasting carried out below 710° C., of the order of 98% for the fluidised bed cyclone product and 99% for the bed product. A small amount of sulphuric acid is added to the sulphate solution to ensure that high recoveries are obtained. The leaching is carried out between 60 and 80° C. and is done in two stages to minimise sulphuric acid requirements. The solution may, at this stage, be purified by the addition of limestone, with or without aeration, to precipitate ferric iron and other impurities such as selenium, tellurium, arsenic, antimony, bismuth and tin prior to the precipitation stage. This operation is not shown on the flow sheet.

The solid residue remaining after removal of the soluble salts may be worked up to recover gold, silver and other valuable metals which it may contain (see $l$).

(d) Precipitation

The copper in the pregnant solution obtained from stages (b) and (c) is precipitated as Chevreul's salt by the addition of a solution of, predominantly magnesium bisulphite which is substantially saturated with sulphur dioxide. Precipitation is effected, after mixing, by heating and maintaining the mixed solutions at a temperature of between 65 and 80° C. while continuously stirring the solutions. The sulphur dioxide evolved in the process is collected and recycled to the limestone solution stage (h). It is difficult to give a single optimum pH or ratio of mixed solutions, without specific reference to the composition of the copper concentrate and without stating specific purity requirements. However, assuming that a fairly high purity salt is desired, the preferred pH in the present example will lie between 1.3 and 1.8, although the following examples will provide a guide to selection and control of pH.

Two copper sulphate solutions, one containing 60 grams of copper per litre and 30 grams of zinc per litre as zinc sulphate, and the other containing 60 grams of copper per litre and 25 grams of manganese per litre in the form of manganous sulphate were prepared. To samples of each magnesium bisulphite solution (1 M) was added, and an initial ratio of magnesium bisulphite to copper sulphate of 1.60 and 0.33 was obtained in samples for each of the two solutions. The samples were heated at 75° C. for five hours and both the copper/zinc solution and the copper/manganese solution it was found that the pH of the samples, as measured at ambient temperature, was approximately 1.7 to 1.9 at a ratio of 1.60, and approximately 1.1 at a ratio of 0.33.

The purity of the Chevreul's salt precipitated from the copper/zinc solution increased from 84% at a ratio of magnesium bisulphite to copper sulphate of 1.60 to above 97% at a ratio of 0.33, while the copper recovery in the precipitate decreased from 92% to 40% respectively.

A further sample of the copper/zinc solution, having an initial magnesium bisulphite to copper sulphite ratio of 0.83 was similarly heated at 75° C. for five hours. The purity of the Chevreul's salt obtained was 97% with a copper recovery of 70%. The final pH was 1.3.

Similarly, the purity of the Chevreul's salt precipitated from the copper manganese solutions increased from 78% to 90% at the ratios of 1.60 and 0.33 respectively, while the copper recovery in the precipitate decreased from 91% to 35% respectively.

A further sample of the copper-manganese solution, having an initial magnesium bisulphite to copper sulphate ratio of 0.83 was similarly heated at 75° C. for five hours. The purity of the Chevreul's salt obtained was 88% with a copper recovery of 65%. The final pH was 1.3.

Regarding the time for which the solutions must be held at the reaction temperature to effect the desired degree of precipitation, it has already been stated that the time is in inverse proportion to temperature and that the optimum temperature and time will be largely determined by economic and other process conditions. For example, the reaction is 87% complete in five hours at 65° C. using four moles of magnesium bisulphite (1 M) to 3 moles of copper sulphate (0.94 M). However, at a temperature of 85° C. the reaction reaches 87% completion in only one hour using magnesium bisulphite and copper sulphate solutions of the above concentrations.

The free sulphuric acid produced in the precipitation stage increases the usefulness of the resultant liquor for the purpose of leaching copper from calcines produced in stage (a), and so reduces the additional quantity of sulphuric acid required to secure efficient recovery of copper in that stage. A portion of the liquor resulting from the reaction in which Chevreul's salt is precipitated is therefore cycled to leaching stage (b), the liquor first being aerated to precipitate iron in stage (m) as shown in the drawings.

As has been already indicated, the Chevreul's salt may be precipitated using a bisulphite solution with or without the presence of free sulphur dioxide. Generally it is preferred to use a bisulphite solution which is substantially saturated with sulphur dioxide, since under these conditions the yield of copper precipitate is enhanced and the acidity of the reaction solution is further increased by the order of 0.1 to 0.2 pH units to thereby improve the selectivity of the precipitation at a given bisulphite to copper sulphate ratio.

The sulphur dioxide liberated by the precipitation reaction is used in the limestone solution stage (h) as shown.

(e) Separation

Chevreul's salt is crystalline and presents no problems in filtration and washing by conventional processes.

(f) and (g) Gypsum precipitation and separation

In the present invention this stage is controlled so as to regenerate the solution of magnesium bisulphite precipitant. This is effected by treating the filtrate from the precipitation stage (d) with calcium bisulphite obtained from the limestone solution stage (h). As has been previously stressed, it is essential that the regenerated precipitant be substantially free of dissolved calcium ions.

The functions of, and control factors involved in these stages have been described in detail above and need not be repeated here. It will therefore suffice to say that they are operated to yield a magnesium bisulphite solution which is saturated with sulphur dioxide and which contains dissolved magnesium sulphate in such proportions to give an approximately equimolar ratio of bisulphite to sulphate. The temperature for reaction in the gypsum precipitation stage is not critical and may be conveniently ambient temperature or, the particular temperature which results from the mixing of the component solutions. As in the separation of the Chevreul's salt, the separation of the liquor from the precipitated gypsum presents no difficulty and can be achieved by conventional decanting or precipitation processes.

(h) Limestone solution

In this stage, finely ground and/or calcined limestone is added to a portion of the solution leaving the gypsum precipitation stage (f), and comprising predominantly magnesium bisulphite and sulphate and sulphur dioxide bearing gas is passed into the suspension, to generate a slurry of calcium bisulphite solution, with dissolved sulphur dioxide, and solid sulphites of calcium and/or magnesium.

Natural limestone will often contain sufficient magnesium carbonate to make up for any losses of magnesium from the process, as indicated above. Otherwise dolomite, dolomitic limestone or other sources of magnesium may be added. Excessive quantities of magnesium would be rejected as insoluble magnesium sulphite in the gypsum precipitation stage.

(i) Calcination of Chevreul's salt

In this stage, the Chevreul's salt is heated in the absence of air at a temperature between 200 and 375° C. Under such conditions the salt decomposes as follows:

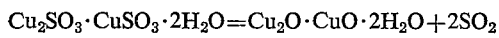

$$Cu_2SO_3 \cdot CuSO_3 \cdot 2H_2O = Cu_2O \cdot CuO \cdot 2H_2O + 2SO_2$$

Heating with the exclusion of air results in the evolution of high purity sulphur dioxide which is used in the limestone solution stage. The hydrated copper oxide residue is subsequently heated to remove moisture and is reduced to metallic copper, in the reduction stage (j) and finally cast as elemental copper in stage (k) according to known procedures.

(l) Cyaniding

Cyanide recovery of silver and gold from leach residues is carried out using known procedures. Gold recoveries exceeding 95% can be obtained by such methods.

I claim,

1. A process for recovering copper from a solution containing copper sulphate comprising the steps of:
    mixing the copper sulphate solution in a first precipitation stage, with an aqueous solution of magnesium bisulphite, and holding the mixed solutions at a temperature above 40° C. to react said solutions together, said copper sulphate solution and said bisulphite solution being mixed together in such proportions that the pH of the reacted solutions lies within the range 1 to 3 (when measured at ambient temperature) thereby precipitating a substantial proportion of the copper as Chevreul's salt and leaving a liquor containing magnesium sulphate in solution;
    separating the Chevreul's salt from said liquor to thereby recover the copper;
    mixing in a second precipitation stage, at least part of said liquor with a solution of calcium bisulphite to precipitate calcium sulphate and to leave a solution of magnesium bisulphite;
    separating the last mentioned bisulphite solution from the precipitated calcium sulphate; and
    returning at least part of the bisulphite solution from said second precipitation stage as the first mentioned bisulphite solution in said first stage.

2. A process for recovering copper from a solution containing copper sulphate comprising the steps of:
    mixing the copper sulphate solution, in a first precipitation stage, with an aqueous solution of magnesium bisulphite which is at least partially saturated with sulphur dioxide and holding the mixed solutions at a temperature of between 60 and 85° C. to react said solutions, said copper sulphate solution and said bisulphite solution being mixed together in such proportions that the pH of the reacted solutions lies within the range 1 to 2 (when measured at ambient temperature) thereby precipitating a substantial proportion of the copper as Chevreul's salt and leaving a liquor containing magnesium in solution;
    separating the Chevreul's salt from said sulphate liquor to thereby recover the copper;

mixing, in a second precipitation stage, said sulphate liquor with a solution of calcium bisulphite to precipitate calcium sulphate and to leave a solution of magnesium bisulphite;

separating the last mentioned bisulphite solution from the precipitated calcium sulphate; and returning at least part of the bisulphite solution from said second precipitation stage as the first mentioned bisulphite solution in said first stage.

3. A process according to claim 1 wherein, in the second precipitation stage, said sulphate liquor and said calcium bisulphite solution are mixed in such proportions as to provide an excess of sulphate to bisulphite in the bisulphite solution returned to the first precipitation stage of up to 2:1 by molar ratio.

4. The process according to claim 1 wherein the bisulphite solution employed in the second precipitation stage is obtained by treating an aqueous suspension of a member selected from the group consisting of limestone and calcium carbonate with sulphur dioxide to liberate carbon dioxide and leave the aforesaid solution of calcium bisulphite.

5. A process according to claim 4 wherein said suspension is substantially saturated with sulphur dioxide to liberate the carbon dioxide, wherein the resultant solution of calcium bisulphite is substantially saturated with sulphur dioxide, and wherein the said bisulphite solution which is returned to the first precipitation stage is also substantially saturated with sulphur dioxide.

6. A process according to claim 4 wherein part of the bisulphite solution produced in the second precipitation stage is returned directly to treat said aqueous suspension.

7. A process according to claim 4 wherein said suspension is treated with sulphur dioxide in such proportions as to produce a slurry comprising, predominantly, solid calcium sulphite and solid calcium sulphate in a solution saturated with dissolved calcium bisulphite and containing dissolved sulphur dioxide and wherein said slurry is employed in the second precipitation stage as the said calcium bisulphite solution.

8. A process according to claim 4 wherein said suspension is first treated with roaster gases containing sulphur dioxide to liberate carbon dioxide and form a substantially carbonate-free suspension comprising, predominantly, calcium sulphite and is then treated with substantially pure sulphur dioxide gas to form a slurry comprising a calcium bisulphite solution having dissolved sulphur dioxide and solid calcium sulphite for use in the second precipitation stage.

9. A process according to claim 4 wherein the make-up magnesium for the process is introduced with said suspension.

10. A process according to claim 1 wherein the copper sulphate solution to be processed contains significant minor proportions of at least one member selected from the group consisting of zinc, manganese, cobalt, nickel, chromium and aluminum in solution, said process being characterized in that said copper sulphate and the aforesaid bisulphite solution are mixed together in the first precipitation stage in such proportions as to achieve a final pH of substantially less than 1.6 to thereby selectively precipitate Chevreul's salt and to leave dissolved in said liquor at least one member selected from the group consisting of zinc, manganese, cobalt, nickel, chromium and aluminum.

11. A process according to claim 10 wherein the liquor obtained after precipitation at a pH of less than 1.6 is mixed with more of the aforesaid bisulphite solution in such proportions as to achieve a final pH of substantially greater than 1.6 to thereby coprecipitate Chevreul's salt and the sulphite of at least one of said metals contained in minor proportions in the copper sulphate solution.

12. A process according to claim 1 wherein the Chevreul's salt precipitated from the first precipitation stage and separated from said sulphate liquor is heated at a temperature of between 150 and 350° C. in the absence of air to liberate high purity sulphur dioxide and leave a hydrated cupro-cupric oxide residue.

References Cited

UNITED STATES PATENTS

| 1,357,952 | 11/1920 | Christenson | 23—129 |
| 2,357,715 | 9/1944 | Westby | 75—115 X |

FOREIGN PATENTS 19,742  10/1934  Australia.

OTHER REFERENCES

"Chemical Abstracts," vol. 46, page 2471, January 1952.

Brasted, R., et al.: Comprehensive Inorganic Chemistry; vol. 2, page 104, D. Van Nostrand Pub., New York, 1954.

OSCAR R. VERTIZ, Primary Examiner

G. O. PETERS, Assistant Examiner

U.S. Cl. X.R.

75—117; 23—129